Patented Mar. 15, 1949

2,464,345

UNITED STATES PATENT OFFICE 2,464,345

PURIFICATION OF ACETIC ANHYDRIDE WITH SODIUM NITRITE

Herman Rainalter and Dorsey A. Ensor, Cumberland, Md., assignors to Celanese Corporation of America, a corporation of Delaware No Drawing. Application August 13, 1947, Serial No. 768,486

2 Claims. (Cl. 260—546)

This invention relates to the treatment of acetic anhydride and relates more particularly to the treatment of acetic anhydride formed by the catalytic vapor phase dehydration of acetic acid whereby odor-producing materials present in said anyhydride may be removed therefrom.

An object of this invention is to provide an efficient and economical process for the elimination of odor-producing materials from acetic anhydride produced by the catalytic vapor phase dehydration of acetic acid.

Other objects of this invention will appear from the following detailed description.

Crude acetic anhydride prepared by the catalytic vapor phase dehydration of acetic acid employing a mixture of phosphoric acid and ammonium phosphate as the dehydration catalyst has been found to contain an appreciable amount of impurities comprising side-reaction products having strong odor-producing characteristics. These odor-producing impurities appear to be certain nitrogen-containing compounds. When the crude anhydride obtained is reacted with sodium hydroxide to neutralize any free phosphoric acid present, the unpleasant odor of the impurities is found to be greatly increased. The markedly disagreeable character of the odor thus produced makes the elimination of the same essential if the acetic anhydride is to be converted into commercially acceptable products.

We have now found that the nitrogen-containing impurities in crude acetic anhydride produced by the vapor phase dehydration of acetic acid employing a mixture of phosphoric acid and ammonium phosphate as the dehydration catalyst, and which give rise to the strongly disagreeable odor mentioned, may be eliminated therefrom by a suitable treatment of the crude anhydride. This advantageous result is obtained in accordance with our invention if the crude acetic anhydride obtained on dehydration is treated with from 0.1 to 0.5% by weight of sodium nitrite and the crude acetic anhydride then distilled. The purified distillate obtained is found to be not only free of odor-producing impurities on neutralization with sodium hydroxide but the color thereof is substantially lighter than that of the original odorous crude product. Mere distillation without the addition of sodium nitrite does not act to remove the odor-producing impurities in the distillate to any appreciable degree.

In order further to illustrate our invention but without being limited thereto, the following example is given:

Example

To 500 parts by weight of crude acetic anhydride obtained by the vapor phase dehydration of acetic acid employing phosphoric acid and ammonium phosphate as the dehydration catalyst are added 0.5 parts by weight of sodium nitrite and the mixture distilled. Starting at 116° C., samples of the distillate are taken as separate cuts at regular intervals. As the temperature rises the cuts are taken at narrower temperature intervals, a total of about 11 separate fractions being taken during the distillation. On neutralization with sodium hydroxide all of the samples are found to be free of the characteristic, unpleasant odor normally encountered in distilled samples which are untreated prior to distillation. In addition, the color developed in the distillate when 4% by weight of concentrated sulfuric acid is added thereto is considerably less than that developed in untreated, distilled acetic anhydride. Thus, the color developed in the sodium nitrite treated acetic anhydride is 10, when compared to the A. S. T. M. water standard, while that of the untreated, distilled anhydride is 50 to 75 when subjected to the same sulfuric acid color-development test.

It is to be understood that the foregoing detailed description is given merely by way of illustration and that many variations may be made therein without departing from the spirit of our invention.

Having described our invention, what we desire to secure by Letters Patent is:

1. Process for the removal of odor-producing impurities from crude acetic anhydride formed by the catalytic vapor phase dehydration of acetic acid while employing a dehydration catalyst containing an ammonium phosphate, which consists is adding sodium nitrite to said crude acetic anhydride and fractionally distilling purified acetic anhydride therefrom.

2. Process for the removal of odor-producing impurities from crude acetic anhydride formed by the catalytic vapor phase dehydration of acetic acid while employing a dehydration catalyst containing an ammonium phosphate, which consists in adding from 0.1 to 0.5% by weight of sodium nitrite to said crude acetic anhydride and fractionally distilling purified acetic anhydride therefrom.

HERMAN RAINALTER.
DORSEY A. ENSOR.

REFERENCES CITED

The following references are of record in the file of this patent:

UNITED STATES PATENTS

| Number | Name | Date |
|---|---|---|
| 1,069,168 | Ornstein | Aug. 5, 1913 |
| 1,499,798 | D'Ans | July 1, 1924 |
| 2,255,421 | Groll et al. | Sept. 9, 1941 |

OTHER REFERENCES

Bacharach et al., Chemical News, vol. 142, pages 305–306 (1931).